United States Patent
Kasama et al.

(10) Patent No.: US 7,783,693 B2
(45) Date of Patent: Aug. 24, 2010

(54) RECONFIGURABLE CIRCUIT

(75) Inventors: Ichiro Kasama, Kawasaki (JP); Masato Miyake, Fukuoka (JP)

(73) Assignee: Fujitsu Semiconductor Limited, Yokohama (JP)

( * ) Notice: Subject to any disclaimer, the term of this patent is extended or adjusted under 35 U.S.C. 154(b) by 1092 days.

(21) Appl. No.: 11/442,971

(22) Filed: May 31, 2006

(65) Prior Publication Data
US 2007/0198619 A1 Aug. 23, 2007

(30) Foreign Application Priority Data
Feb. 22, 2006 (JP) .............................. 2006-045855

(51) Int. Cl.
*G06F 7/38* (2006.01)
(52) U.S. Cl. .................................................. 708/230
(58) Field of Classification Search ....................... None
See application file for complete search history.

(56) References Cited

U.S. PATENT DOCUMENTS

| | | | |
|---|---|---|---|
| 4,760,525 A | 7/1988 | Webb | |
| 5,036,453 A | 7/1991 | Renner et al. | |
| 5,634,065 A * | 5/1997 | Guttag et al. | 708/230 |
| 5,659,700 A | 8/1997 | Chen et al. | |
| 5,901,298 A | 5/1999 | Cummins et al. | |
| 7,020,673 B2 * | 3/2006 | Ozawa | 708/490 |
| 7,580,963 B2 * | 8/2009 | Kawano et al. | 708/230 |
| 2003/0055852 A1 * | 3/2003 | Wojko | 708/230 |
| 2003/0184339 A1 | 10/2003 | Ikeda et al. | |
| 2004/0199688 A1 * | 10/2004 | Vorbach et al. | 710/100 |
| 2005/0021578 A1 * | 1/2005 | Chen et al. | 708/230 |
| 2006/0010306 A1 | 1/2006 | Saito et al. | |
| 2007/0067379 A1 * | 3/2007 | Motozuka et al. | 708/490 |

FOREIGN PATENT DOCUMENTS

| | | |
|---|---|---|
| JP | 07-168713 | 7/1995 |
| JP | 07-319762 | 12/1995 |

OTHER PUBLICATIONS

European Office Action dated Jun. 19, 2009 and issued in the corresponding European Patent Application 06 252 787.4.
D. Grant, et al., "Synthesis of Address Generators", International Conference on Computer Aided Design, Nov. 5, 1989, pp. 116-119.
Jong-eun Lee, et al., "Reconfigurable ALU Array Architecture with Conditional Execution", International SOC Design Conference, Oct. 25, 2004.
Extended European Search Report, mailed Dec. 21, 2006, and issued in corresponding European Patent Application No. 06252787.4-1243.

* cited by examiner

*Primary Examiner*—David H Malzahn
(74) *Attorney, Agent, or Firm*—Fujitsu Patent Center (57) ABSTRACT

A reconfigurable circuit is provided, which includes a first arithmetic unit that performs addition or subtraction of a first input data and a second input data and outputs output data, and a first selector that selects an output data of the first arithmetic unit or a third input data and outputs the selected one as the first input data to the first arithmetic unit.

11 Claims, 11 Drawing Sheets

RECONFIGURABLE CIRCUIT

CROSS-REFERENCE TO RELATED APPLICATIONS

This application is based upon and claims the benefit of priority from the prior Japanese Patent Application No. 2006-045855, filed on Feb. 22, 2006, the entire contents of which are incorporated herein by reference.

BACKGROUND OF THE INVENTION

1. Field of the Invention

The present invention relates to a reconfigurable circuit.

2. Description of the Related Art

A reconfigurable circuit can be reconfigured by dynamically switching a plurality of function circuits. An address generation function circuit realizes simple one-dimensional consecutive address generation and simple two-dimensional address generation. As the circuit configuration, the function is provided by including one (one dimension) or a plurality of (two dimension or more) simple incremental circuits. As operation procedure, it runs in response to trigger, and performs relatively simple operation only.

In a patent document 1 below, a data transfer address generation device using an ALU is described. A request address data which is output from a bus master to a slave unit is stored in a request address register. Signal which specifies ordering from the bus master is decoded in a system bus interface section, and any address table is selected by a multiplexer. A count value of a binary counter which is incremented in response to a count clock is translated into address table data by the selected address table and supplied to the ALU via the multiplexer. The address table data and the request address data are added at the ALU, as a result, when a sign bit indicates an invalid address, the binary counter is further incremented. The address data from the ALU is masked by a mask circuit to generate transfer address data.

In a patent document 2 below, a digital signal processor to perform address generation is described. In the digital signal processor, which comprises a plurality of data input buses which transmit input data signal, a data memory which receives respective input data signal from the data input buses and stores the input data signal therein, an arithmetic section which receives input data signal being output from the data memory and performs arithmetic processing, and an address generation section which controls the operation of the arithmetic section and the data memory, a data input/output word length in the arithmetic section and a word length of the address operation in the address generation section are set to be the same, and an operation data calculated in the arithmetic section is set as an address of the address generation section.

[Patent document 1] Japanese Patent Application Laid-open No. Hei 7-319762

[Patent document 2] Japanese Patent Application Laid-open No. Hei 7-168713

In a reconfigurable circuit, only a simple incremental circuit for address generation is provided, which makes it difficult to perform sophisticated address generation.

SUMMARY OF THE INVENTION

An object of the present invention is to provide a reconfigurable circuit which realizes an advanced counter.

According to one aspect of the present invention, a reconfigurable circuit is provided, which includes a first arithmetic unit which adds or subtracts first and second input data and outputs output data, and a first selector which selects between the output data of the first arithmetic unit or third input data and outputs the selected data as the first input data to the first arithmetic unit.

DETAILED DESCRIPTION OF THE PREFERRED EMBODIMENTS (Whole Configuration)

Figure 1:
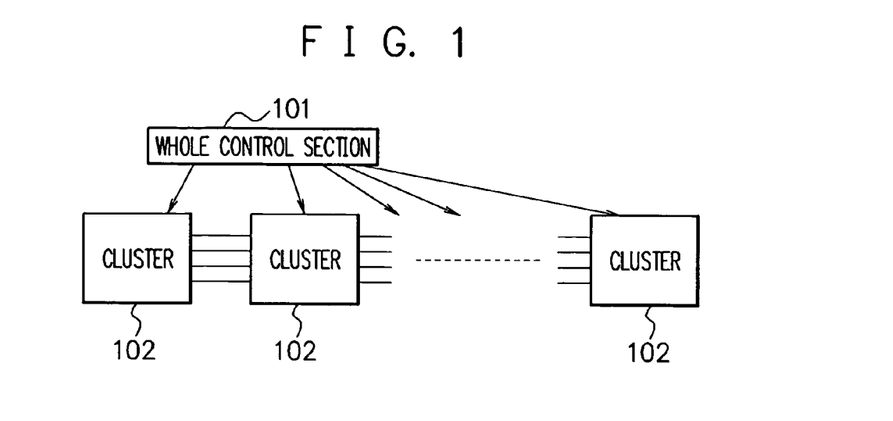
FIG. 1 is a diagram showing a configuration example of a reconfigurable circuit according to an embodiment of the present invention.

FIG. 1 is a diagram showing a configuration example of a reconfigurable circuit according to an embodiment of the present invention. A whole control section 101 controls a plurality of clusters 102. Communication of control signal and data is performed among the plurality of clusters 102. The reconfigurable circuit is composed of LSI's.

Figure 2:
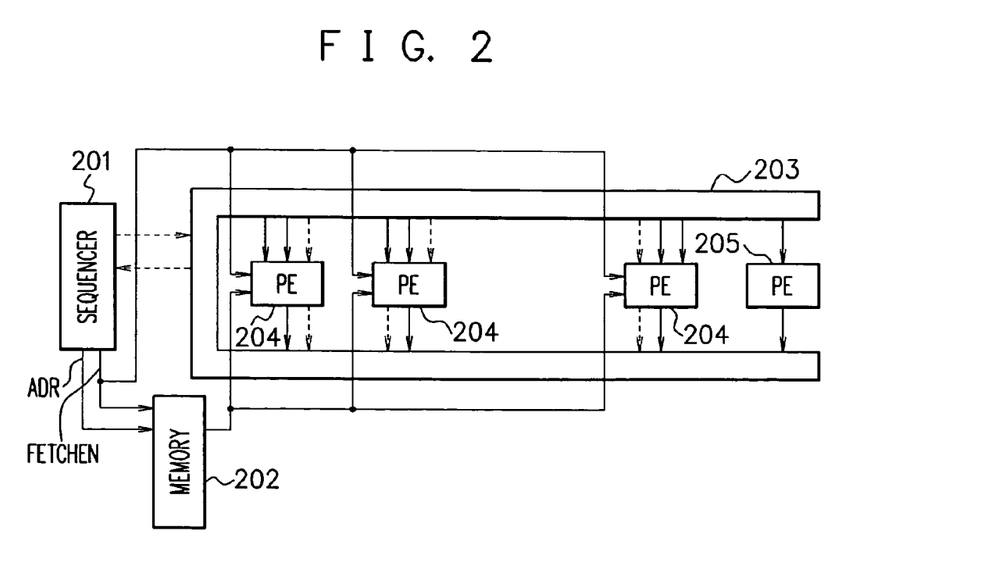
FIG. 2 is a diagram showing a configuration example of a cluster.

FIG. 2 is a diagram showing the configuration example of the cluster 102. A sequencer 201, a plurality of PE's (Processing Element) 204, and a RAM 205 are connected to a network 203 and perform communication of control signal and data. Solid line arrows indicate data and dotted line arrows indicate control signal. The RAM 205 receives address and outputs data from and to the network 203. The sequencer 201 generates and outputs a fetch enable signal FETCHEN and an address ADR. A configuration memory 202 stores configuration data, receives the fetch enable signal FETCHEN and the address ADR, and outputs the configuration data to the plurality of PE's 204. The PE 204 receives the fetch enable signal FETCHEN and the configuration data, and in response to them, performs operation of predetermined functions such as an adder/subtracter, a counter, and a multiplier.

Figure 3:
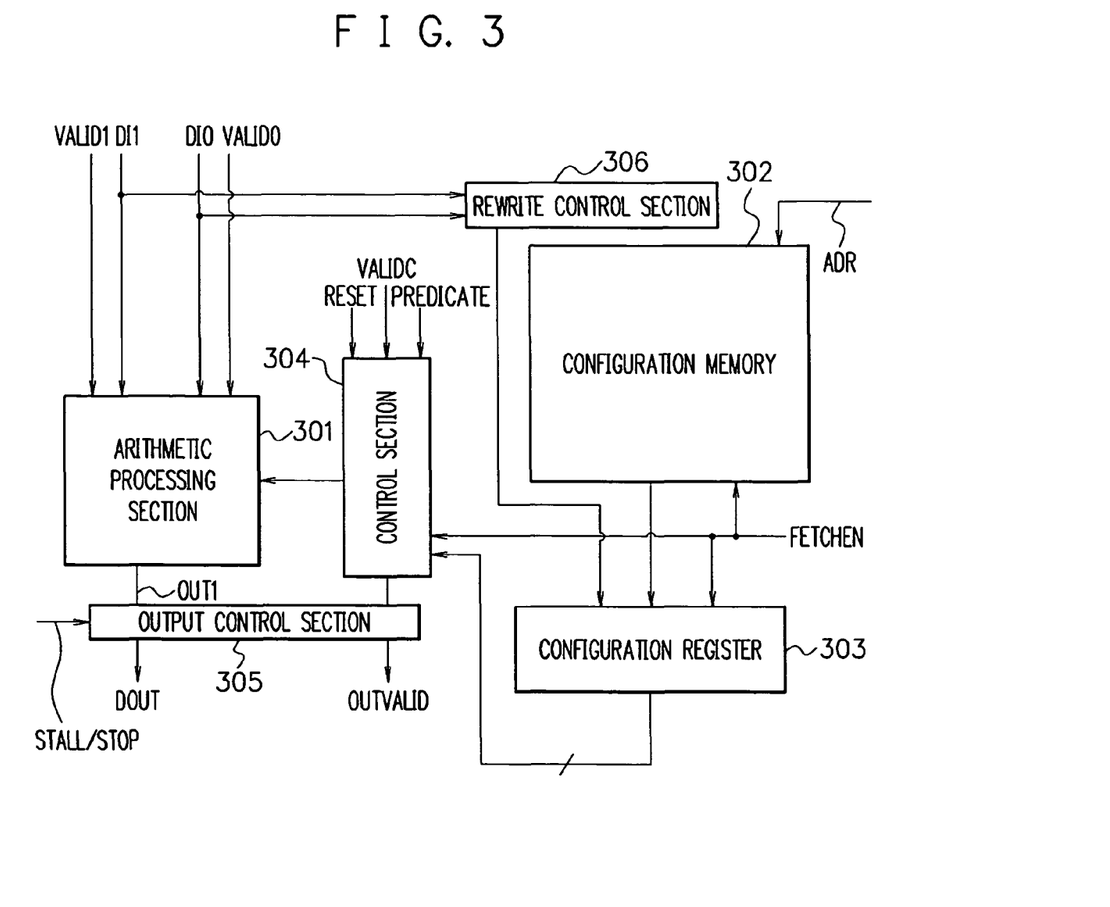
FIG. 3 is a diagram showing a configuration example of a PE.

FIG. 3 is a diagram showing a configuration example of the PE 204. A configuration memory 302 corresponds to the configuration memory 202 in FIG. 2. The configuration memory 202 is distributed and allocated to each PE 204. An arithmetic processing section 301 receives data DI0, DI1 and valid signals VALID0, VALID1, performs computing based on them, and outputs data DOUT via an output control section 305. The valid signal VALID0 is a timing signal indicating whether the data DI0 is valid or invalid. The valid signal VALID1 is a timing signal indicating whether the data DI1 is valid or invalid. The configuration memory 302 is a RAM, receives the fetch enable signal FETCHEN and the address ADR, and outputs the configuration data in response to the address ADR to a configuration register 303. The configuration register 303 stores the configuration data in response to the fetch enable signal FETCHEN. A control section 304 receives a reset signal RESET, a valid signal VALIDC, and a predicate signal PREDICATE, controls the arithmetic processing section 301 in response to the data of the configuration register 303, and outputs valid a signal OUTVALID via the output control section 305. The output control section 305 has a register, and outputs the output signals of the arithmetic processing section 301 and the control section 304 as the output signals DOUT and OUTVALID respectively, in response to signal STALL/STOP. That is, the output control section 305 controls output timing of the output signals DOUT and OUTVALID. A write control section 306 receives the data DI0 and DI1, and writes data into the configuration register 303 in response to the data DI0 or DI1.

Figure 4:
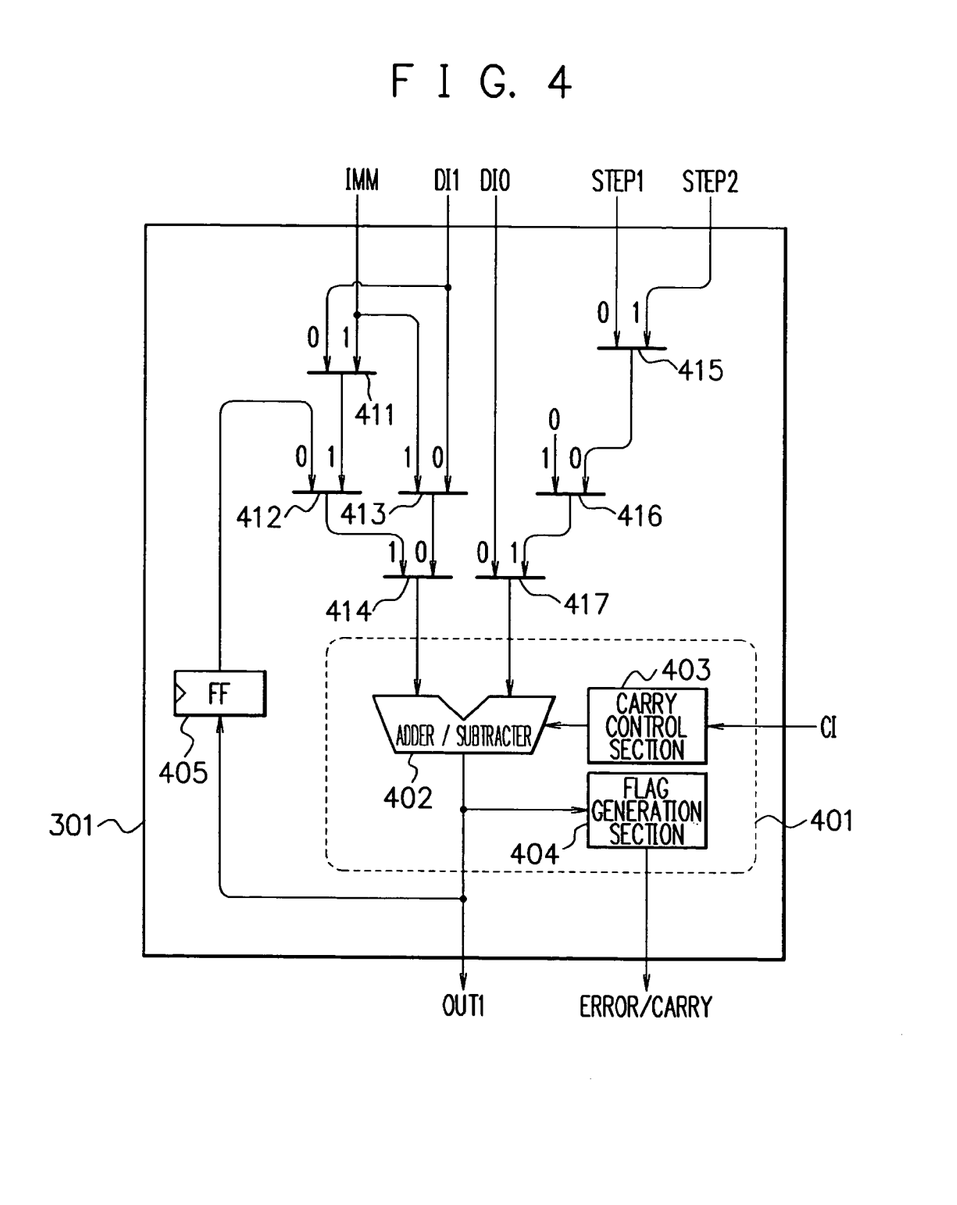
FIG. 4 is a diagram showing a configuration example of an arithmetic processing section.

FIG. 4 is a diagram showing a configuration example of the arithmetic processing section 301. The arithmetic processing section 301 has an ALU (Arithmetic and Logic Unit) 401, a flip-flop (register) 405, and selectors 411 to 417. The ALU 401 has an adder/subtracter (arithmetic unit) 402, a carry control section 403, and a flag generation section 404.

The selector 411 selects between the data DI1 or an immediate value IMM and outputs it. The data DI1 is one which is input from the network 203 in FIG. 2. The immediate value IMM is data which has been stored in the configuration register 303 in FIG. 3. The selector 412 selects between the output data of the selector 411 or the data of the flip-flop 405 and outputs it. The selector 413 selects between the data DI1 or the immediate value IMM and outputs it. The selector 414 selects between the output data of the selector 412 or 413 and outputs it. The selector 415 selects between a step size STEP1 or STEP2 and outputs it. The step sizes STEP1 and STEP2 have been stored in the configuration register 303 and indicate the step sizes of a counter. The selector 416 selects between the output data of the selector 415 or an initial value 0 and outputs it. The selector 417 selects between the output data of the selector 416 or the data DI0 and outputs it.

The carry control section 403 receives a carry data CI and outputs it to the adder/subtracter 402. The adder/subtracter 402 receives the output data of the selectors 414 and 417 and the carry data CI, performs addition or subtraction, and outputs data OUT1. The flag generation section 404 outputs an error flag ERROR, a carry flag CARRY, and a predicate signal PREDICATE based on the output data OUT1. The flip-flop 405 latches the data OUT1 and outputs it to the selector 412. The error flag ERROR, the carry flag CARRY, and the predicate signal PREDICATE are output via a flip-flop within the output control section 305 in FIG. 3.

The PE 204 in FIG. 2 has ALU mode and counter mode in response to the configuration data. The arithmetic processing section 301 operates as an ALU in the ALU mode, and operates as a counter in the counter mode. For example, the counter can count and generate address.

The selector 411 is the one to select the immediate value IMM or the data DI1 and output it as an initial address value in the counter mode. The selector 412 selects and outputs the output of the selector 411 when loading the initial address value (initial time) in the counter mode, in other cases selects and outputs the last time address value which is the output of the flip-flop 405. The selector 413 is the one to select the immediate value IMM or the data DI1 and output it in the ALU mode. The selector 414 selects and outputs the output of the selector 412 in the counter mode, and selects and outputs the output of the selector 413 in the ALU mode.

The selector 415 selects the step size STEP1 or STEP2 and outputs it in the counter mode. The selector 416 selects and outputs 0 when loading the initial address value in the counter mode, in other cases selects and outputs the output of the selector 415. The selector 417 selects and outputs the output of the selector 416 in the counter mode, and selects and outputs the data DI0 in the ALU mode.

In FIG. 3, the configuration register 303 has an operation mode register for storing the counter mode or the ALU mode. The operation mode register stores operation mode data which is read out from the configuration memory 302 in response to the fetch enable signal FETCHEN. The control section 304 controls the selectors 411 to 417 in accordance with the configuration data to be stored in the configuration register 303.

Figure 5:
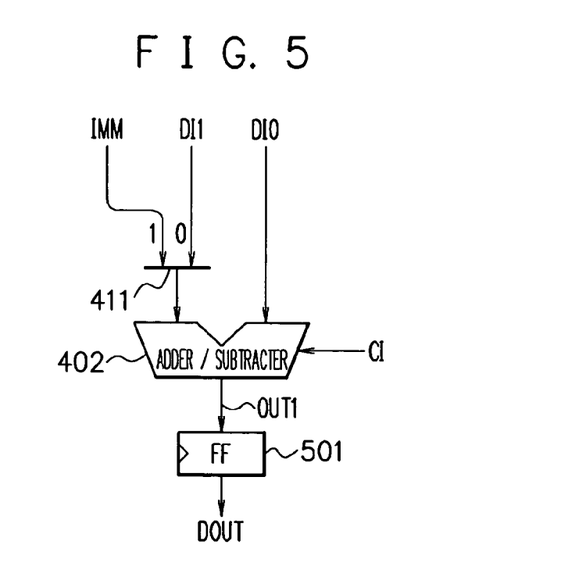
FIG. 5 is a diagram for illustrating an operation of the arithmetic processing section in ALU mode.

FIG. 5 is a diagram for illustrating an operation of the arithmetic processing section 301 in FIG. 4 in the ALU mode. The selector 411 selects the immediate value IMM or the data DI1 in response to the configuration data, and outputs it to the adder/subtracter 402. The adder/subtracter 402 receives the output of the selector 411, the data DI0, and the carry data CI, performs addition or subtraction, and outputs data OUT1. A flip-flop 501, which is provided within the output control section 305 in FIG. 3, latches the data OUT1 at a predetermined timing, and outputs data DOUT.

Figure 6:
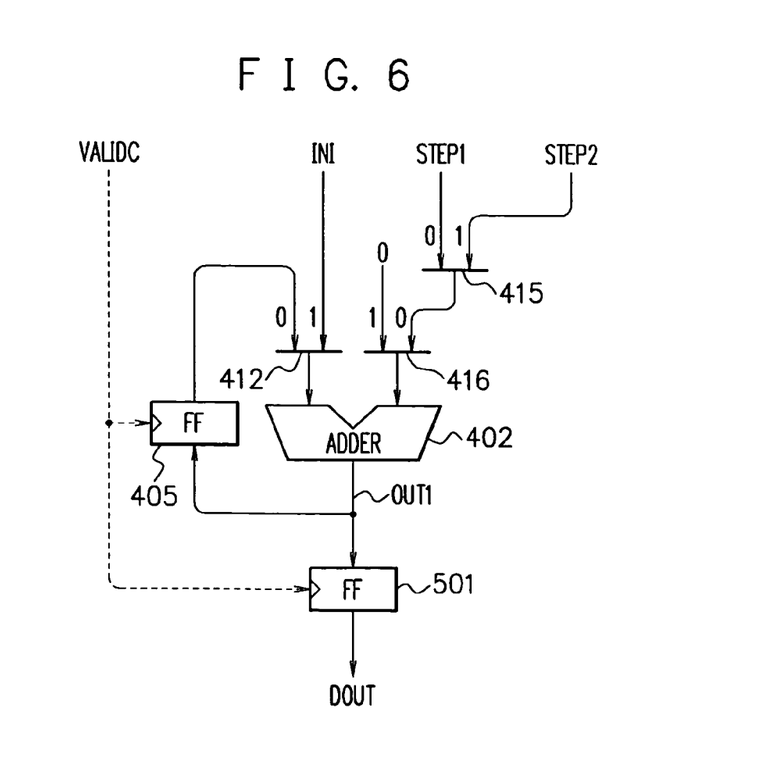
FIG. 6 is a diagram for illustrating an operation of the arithmetic processing section in counter mode.

FIG. 6 is a diagram for illustrating an operation of the arithmetic processing section 301 in FIG. 4 in the counter mode. Hereinafter, the case where address value is counted will be described as an example, other values however can be counted. The selector 412 selects and outputs an initial address value INI when loading the initial address value, in other cases selects and outputs the last time address value which is the output of the flip-flop 405. The initial address value INI is the output value of the selector 411 in FIG. 4. The selector 415 selects a step size STEP1 or STEP2 of the counter. A two-dimensional address can be generated by using the step sizes STEP1 and STEP2. The selector 416 selects and outputs 0 when loading the initial address value INI, in other cases selects and outputs the output of the selector 415. The adder 402 adds the output values of the selectors 412 and 416, and outputs an address value OUT1 to the flip-flops 405 and 501. The flip-flop 405 latches the address value OUT1 in synchronization with the valid signal VALIDC according to the operation mode, and outputs it to the selector 412. The flip-flop 501, which is provided within the output control section 305 in FIG. 3 as in the case of FIG. 5, latches the address value OUT1 at a predetermined timing in synchronization with the valid signal VALIDC according to the operation mode, and outputs address value DOUT.

The initial value INI can be obtained in one cycle from external data path of the network 203 (FIG. 2), and can be set as an initial value of the counter operation. As shown in FIG. 4, the initial value INI can use not only the data IMM within the configuration register 303 but also the data DI1 from the network 203.

The counter mode includes interval mode and count mode. Hereinafter, each of the operations will be described.

(Interval Mode)

Figure 7:
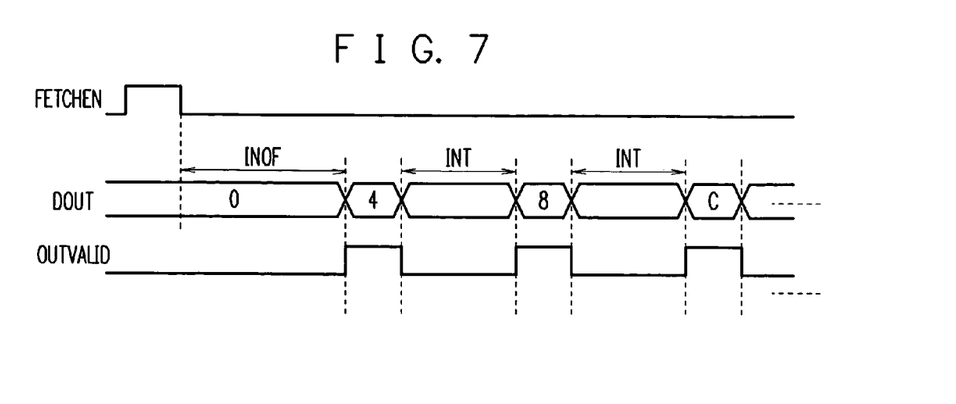
FIG. 7 is a timing chart for illustrating an operation example of interval mode.

FIG. 7 is a timing chart for illustrating an operation example of interval mode. The control section 304 initiates the arithmetic processing section 301 as a counter in response to the pulse of the fetch enable signal FETCHEN as a trigger. After the pulse of the fetch enable signal FETCHEN, when an initial offset time INOF elapses, 4 is output as the address value DOUT, and a valid signal OUTVALID becomes high level. The initial offset time INOF is, for example, the time of five clocks. The valid signal OUTVALID indicates that the address value DOUT is valid at high level, while the address value DOUT is invalid at low level. Then, each time an interval time INT elapses, the next address value DOUT and the valid signal OUTVALID are output. For example, the interval time INT is the time of three clocks which is the interval time between respective address output values DOUT. In this case, the initial address value INI is 4, and the step size STEP1 is 4. The initial offset time INOF and the interval time INT have been stored in the configuration memory 302 and the configuration register 303 in FIG. 3. The output control section 305 controls the output timing of the address output value DOUT in accordance with the interval time INT within the configuration register 303. According to the interval mode, the counter can be initiated in cooperation with application operation by using the fetch enable signal FETCHEN.

Figure 8:
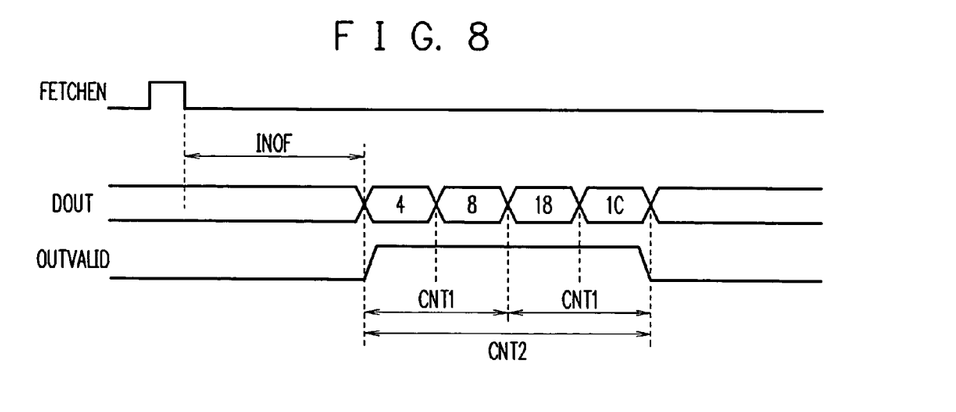
FIG. 8 is a timing chart for illustrating another operation example of the interval mode.

FIG. 8 is a timing chart for illustrating another operation example of the interval mode. The operation example in FIG. 8 is the one in which the above interval time INT is set to 0. And, the example in which the two-dimensional address is set using the step sizes STEP1 and STEP2 is shown. The initial address value is set to 4, the first step size STEP1 is set to 4, the second step size STEP2 is set to 10 (hexadecimal), a first number of output times CNT1 is set to 2, and a second number of output times CNT2 is set to 2. The above set values have been stored in the configuration memory 302 and the configuration register 303.

Since the initial address value has been set to 4, the first address value DOUT becomes 4. Next, since the first step size STEP1 is 4, the second address value DOUT becomes 8. Since the first number of output times CNT1 is 2, one-dimensional address generation is finished. Next, since the second step size STEP2 is 10 (hexadecimal), a third address value DOUT becomes 18 (hexadecimal). Next, the first step size STEP1 is 4, a fourth address value DOUT becomes 1C (hexadecimal). Since the first number of output times CNT1 is 2, one-dimensional address generation is finished, and since the second number of output times CNT2 is 2, the two-dimensional address generation is also finished. Since the interval time INT is 0, four address values DOUT are continuously output, and during that time the valid signal OUTVALID keeps high level.

Figure 9:
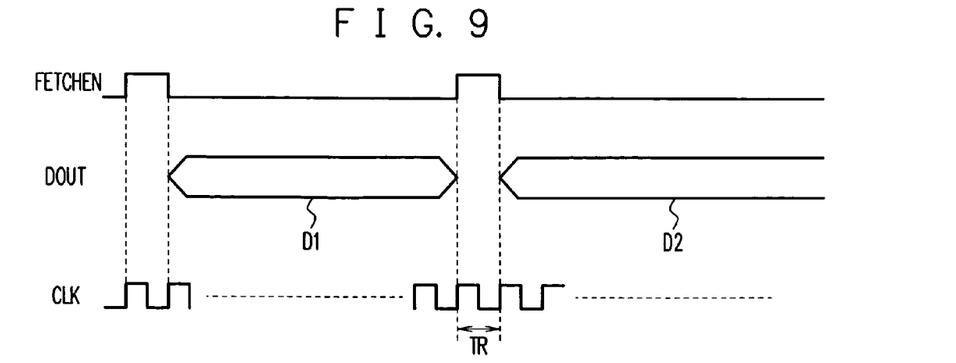
FIG. 9 is a timing chart for illustrating another operation example of the interval mode.

FIG. 9 is a timing chart for illustrating another operation example of the interval mode. When a first pulse of the fetch enable signal FETCHEN is generated, a first configuration data within the configuration memory 302 is set in the configuration register 303, and a first address D1 is generated. Then, when a second pulse of the fetch enable signal FETCHEN is generated, the counter is self-reset in synchronization with a clock CLK, a second configuration data within the configuration memory 302 is set in the configuration register 303, and a second address D2 is generated.

(Count Mode)

Figure 10:
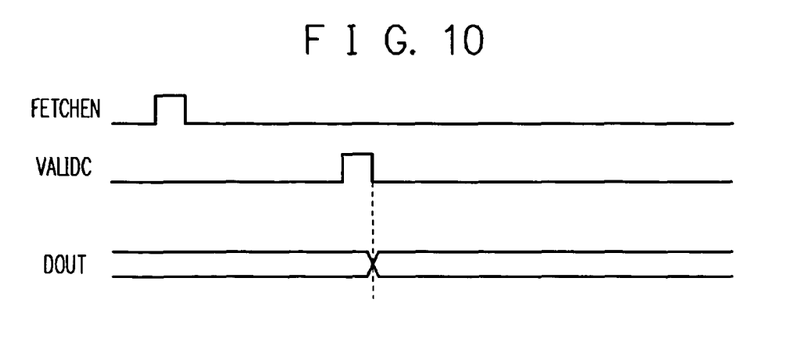
FIG. 10 is a timing chart for illustrating an operation example of first counter mode.

Count mode includes a first count mode and a second count mode. Referring to FIG. 10, the first count mode will be described, and referring to FIG. 11, the second count mode will be described.

FIG. 10 is a timing chart for illustrating an operation example of the first count mode. When a pulse of the fetch enable signal FETCHEN is generated, though configuration data is set, the counter does not start operation. When a valid signal VALIDC becomes high level, the counter is initiated at the next cycle (clock). That is, the control section 304 receives the valid signal VALIDC being output from other PE 204, and initiates the arithmetic processing section 301 with the valid signal VALIDC as a trigger. Then, the counter repeatedly counts and outputs a count value as the address value DOUT. It is possible to direct start-up of the counter from outside by using the valid signal VALIDC.

Figure 11:
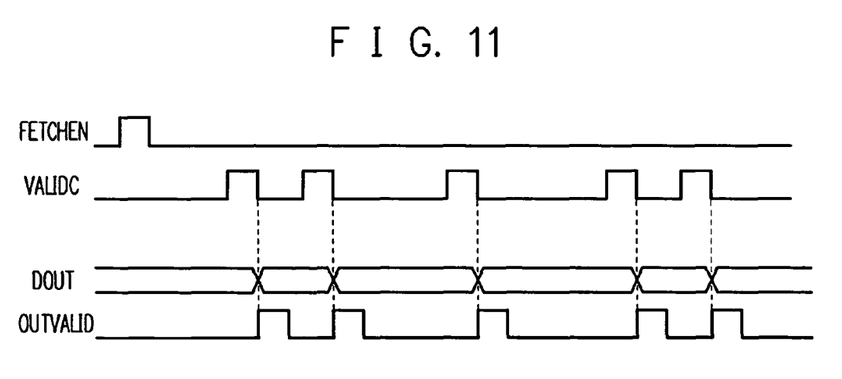
FIG. 11 is a timing chart for illustrating an operation example of second counter mode.

FIG. 11 is a timing chart for illustrating an operation example of the second count mode. When a pulse of the fetch enable signal FETCHEN is generated, though configuration data is set, the counter does not start operation. When a valid signal VALIDC becomes high level, the counter is initiated. However, the case of FIG. 11 is different from that of FIG. 10 in that the valid signal VALIDC is used as a synchronous signal of the flip-flops 405 and 501, as shown in FIG. 6. That is, each pulse of the valid signal VALIDC directs the output timing of each count value DOUT. Whenever the pulse of the valid signal VALIDC is input, the count value DOUT is output and the valid signal OUTVALID becomes high level. The output control section 305 receives a valid signal VALIDC being output from other PE 204, and controls the output timing of each count value (output data) DOUT in accordance with the valid signal VALIDC. It is possible to direct output timing of each count value DOUT from outside by using the valid signal VALIDC.

Figure 12:
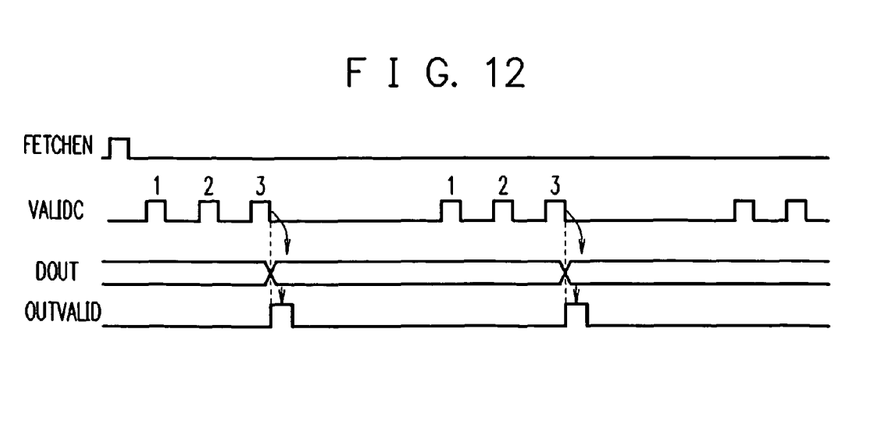
FIG. 12 is a timing chart for illustrating another operation example of the second counter mode.
Figure 14:
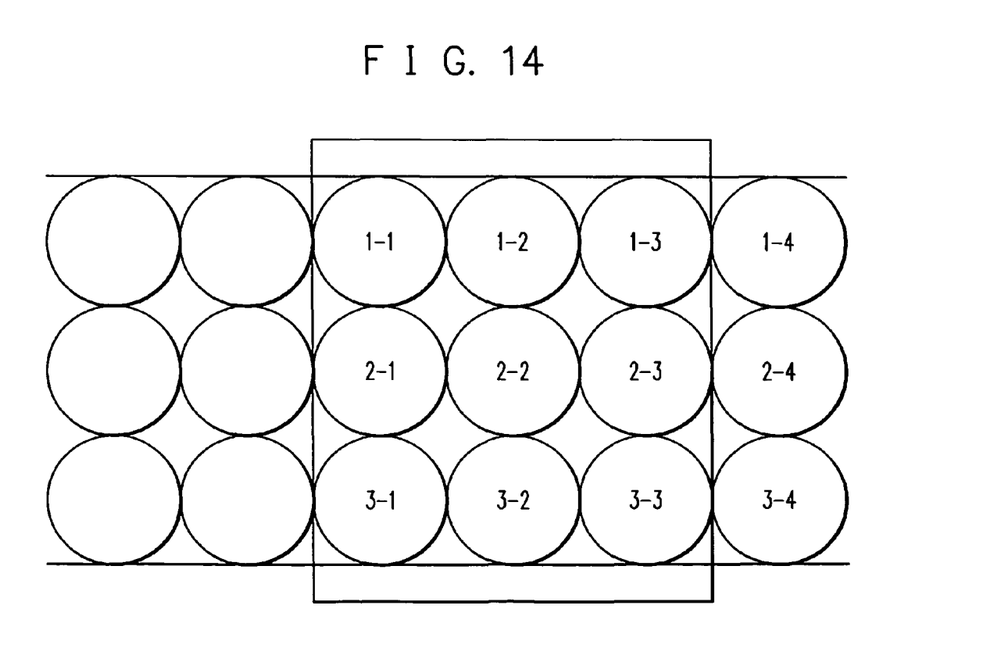
FIG. 14 is a diagram showing pixel data of two-dimensional image.

FIG. 12 is a timing chart for illustrating another operation example of the second count mode, and FIG. 14 is a diagram showing pixel data of the two-dimensional image. An operation example when mode VTIM is set to 0 is shown. Whenever three pulses of valid signal VALIDC are input, output of the count value DOUT and the valid signal OUTVALID are directed. In the case that the mode VTIM is 0, whenever the last pulse of the three ones of the valid signal VALIDC is input, the count value DOUT is output and the valid signal OUTVALID becomes high level. For example in FIG. 14, when addresses of pixel data 1-3, 2-3, and 3-3 being right side column among 3×3 pixels are generated, this operation can be used.

Figure 13:
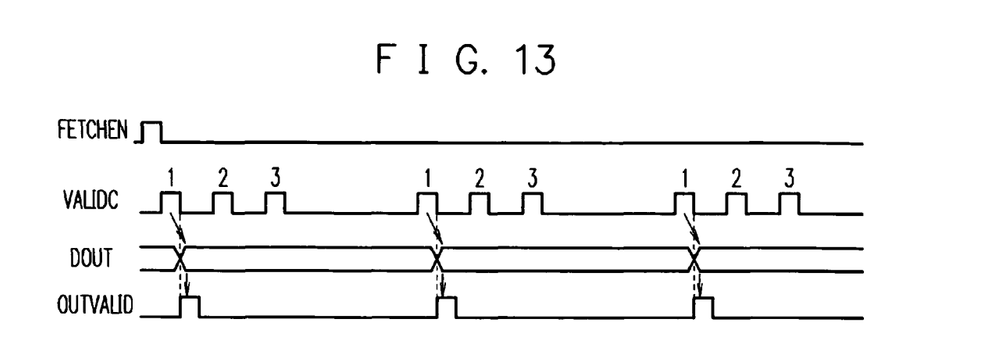
FIG. 13 is a timing chart for illustrating another operation example of the second counter mode.

FIG. 13 is a timing chart for illustrating another operation example of the second count mode. An operation example when mode VTIM is set to 1 is shown. Whenever three pulses of valid signal VALIDC are input, output of a count value DOUT and valid signal OUTVALID are directed. In the case that the mode VTIM is 1, whenever the first pulse of the three ones of the valid signal VALIDC is input, the count value DOUT is output and the valid signal OUTVALID becomes high level. For example in FIG. 14, when addresses of pixel data 1-1, 2-1, and 3-1 being left side column among 3×3 pixels are generated, this operation can be used.

(Predicate Signal)

Figure 15:
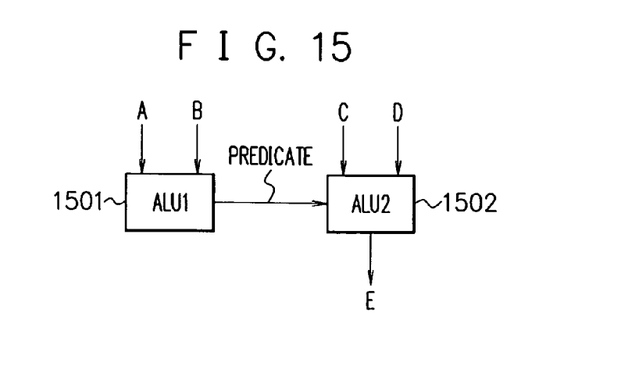
FIG. 15 is a diagram showing a first ALU, a second ALU, and predicate signal.

FIG. 15 is a diagram showing a first ALU 1501, a second ALU 1502, and a predicate signal PREDICATE. The ALU 1501 and 1502 are each ALU within different PE 204. The predicate signal PREDICATE is a flag signal which is generated by computing result of ALU (arithmetic unit), for example, which is generated and output by the flag generation section 404 in FIG. 4. For example, the first ALU 1501 makes the predicate signal PREDICATE high level (e.g., 11 (binary)) when data A and B are equal, while it makes the predicate signal PREDICATE low level when data A and B are not equal. The second ALU 1502 adds data C and D and outputs data E when the predicate signal PREDICATE is high level, while it keeps output data E when the predicate signal PREDICATE is low level.

Figure 16:
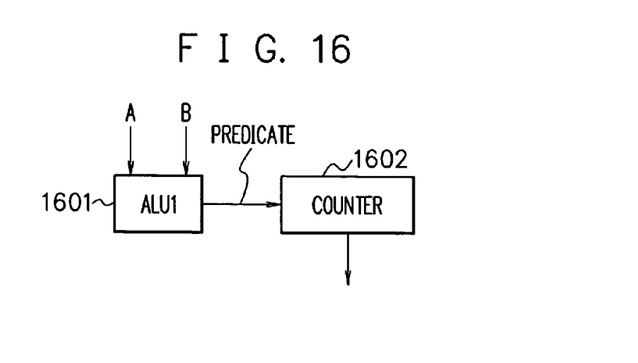
FIG. 16 is a diagram showing an ALU, a counter, and predicate signal.

FIG. 16 is a diagram showing an ALU 1601, a counter 1602, and a predicate signal PREDICATE. The ALU 1601 and the counter 1602 are each ALU and counter within different PE 204. The ALU 1601 indicates PE 204 in the ALU mode, while the counter indicates PE 204 in the counter mode. The ALU 1601 generates the predicate signal PREDICATE in accordance with computing result of inner arithmetic unit. For example, the ALU 1601 makes the predicate signal PREDICATE high level (e.g., 11 (binary)) when data A and B are equal, while it makes the predicate signal PREDICATE low level when data A and B are not equal. The counter 1602 stops the operation when the predicate signal PREDICATE is high level, while it starts the operation when the predicate signal PREDICATE is low level. That is, the PE 204 which operates as the counter 1602, in the counter mode, starts or stops the operation as the counter in accordance with the predicate signal PREDICATE. In this way, the counter 1602 can start or stop due to operation factor of ALU 1601 within other PE 204.

Figure 17:
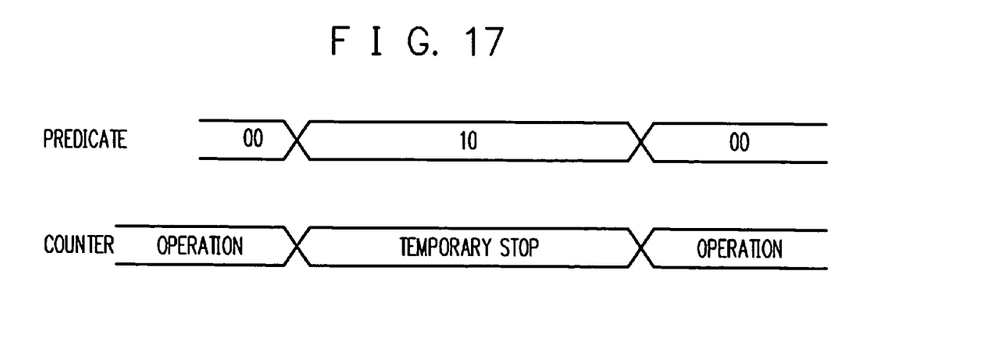
FIG. 17 is a timing chart showing temporary stop of a counter due to predicate signal.

FIG. 17 is a timing chart showing temporary stop of a counter due to a predicate signal PREDICATE. The predicate signal PREDICATE which is 00 (binary) indicates operation order of the counter, while which is 10 (binary) indicates temporary stop order of the counter. The counter operates when the predicate signal PREDICATE is 00 (binary), while the counter makes the operation temporary stop when the predicate signal PREDICATE is 10 (binary). After that, when the predicate signal PREDICATE becomes 00 (binary), the counter restarts the operation.

Figure 18:
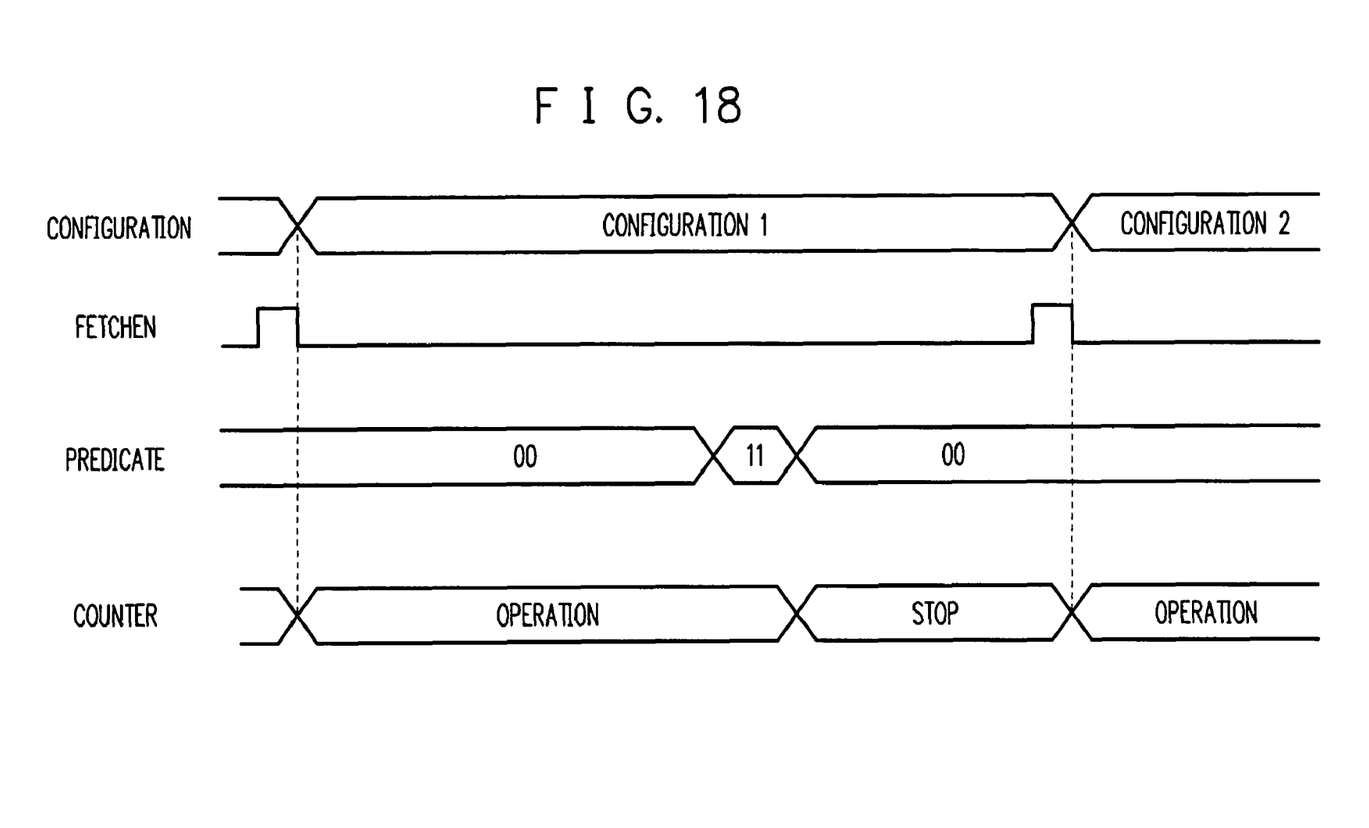
FIG. 18 is a timing chart showing perfect stop of the counter due to the predicate signal.

FIG. 18 is a timing chart showing perfect stop of a counter due to predicate signal PREDICATE. The predicate signal PREDICATE which is 00 (binary) indicates operation order of the counter, while which is 11 (binary) indicates perfect stop order of the counter. A first configuration data is set when a first pulse of fetch enable signal FETCHEN is generated. The counter operates when the predicate signal PREDICATE is 00 (binary). After that, when at least one cycle of clock of the fetch enable signal FETCHEN becomes 11 (binary), the counter perfectly stops at the next cycle (clock). After that, even though the predicate signal PREDICATE becomes 00 (binary), the counter keeps stop. That is, when the operation stop of the counter is directed by the predicate signal PREDICATE, the PE 204 stops operation as the counter until the fetch enable signal FETCHEN is input.

Next, a second configuration data is set, when a second pulse of the fetch enable signal FETCHEN is generated. The counter operates when the predicate signal PREDICATE becomes 00 (binary).

(Data Rewriting of Configuration Register)

Figure 19:
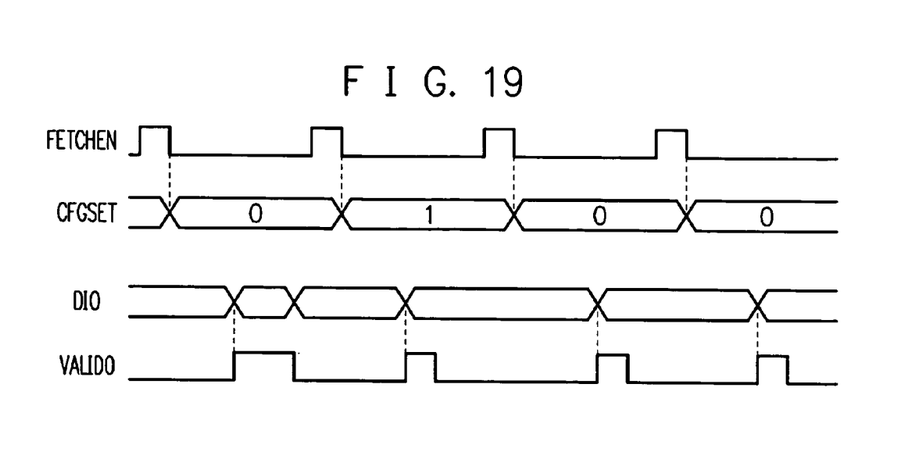
FIG. 19 is a timing chart showing a process where a write control section rewrites data of a configuration register.

FIG. 19 is a timing chart showing a process where the write control section 306 in FIG. 3 rewrites data of the configuration register 303. Each time a fetch enable signal FETCHEN is generated, configuration data is set and a configuration rewrite setting register CFGSET within the configuration register 303 is set. The configuration rewrite setting register CFGSET, when being 0, prohibits rewriting the configuration register 303, when being 1, permits rewriting the configuration register 303. A valid signal VALID0, when being high level, indicates that data DI0 is valid, and when being low level, indicates that data DI0 is invalid.

Figure 20:
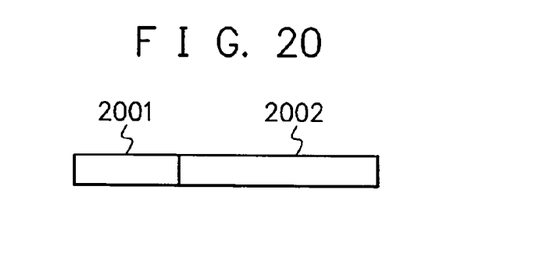
FIG. 20 is a diagram showing a configuration example of data.

FIG. 20 is a diagram showing a configuration example of the data DI0 described above. The data DI0 indicates a header 2001 and a data 2002. The header 2001 specifies a register which is a target to be rewritten within the configuration register 303. For example, the header 2001 can specify a register for initial address value INI, step size STEP1 or the like. The data 2002 indicates the data to be written into the specified register described above.

The write control section 306 writes the specified data into the specified register based on the data DI0. In this case, the write control section 306 can not rewrite the configuration register 303 when the configuration rewrite setting register CFGSET is 0, while it can rewrite the configuration register 303 when the configuration rewrite setting register CFGSET is 1.

The write control section 306 within the first PE 204 receives the data DI0 which is output from the second PE 204. The configuration register 303 has a step size register for storing the step sizes STEP1 and STEP2 of the counter, an initial value register for storing an initial value INI, a rewrite setting register CFGSET for storing the data which indicates permitting data rewrite of the step size register, the initial value register or the like. The write control section 306 within the first PE 204 rewrites the step size register, the initial value register or the like in response to the data DI0, only when the rewrite set register CFGSET stores the data which indicates permitting to rewrite. The write control section 306 rewrites the step size register, the initial value register or the like in response to the data DI0, even though the fetch enable signal FETCHEN is not input.

Figure 21:
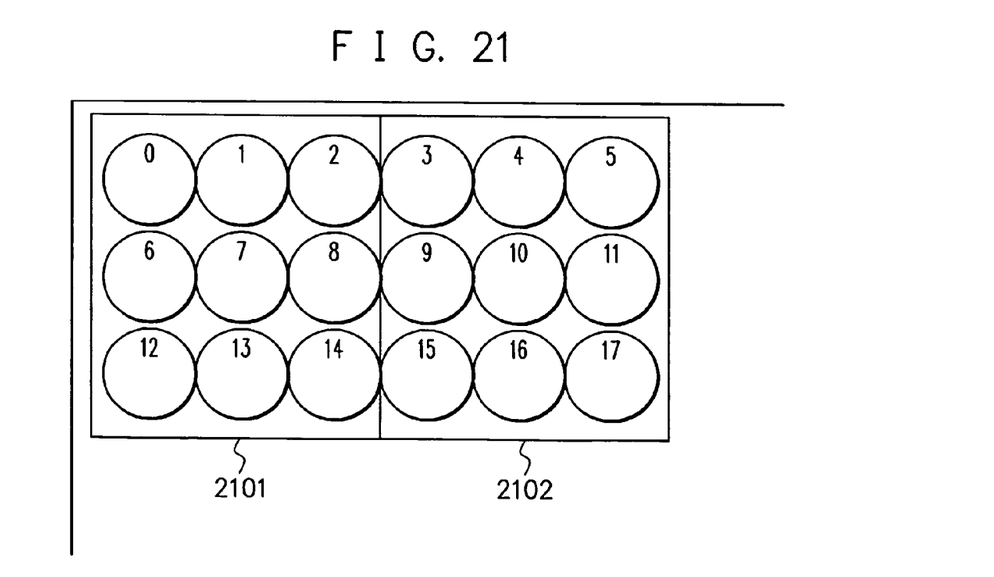
FIG. 21 is a diagram for illustrating a three-dimensional address generation method by rewriting data of the configuration register.

FIG. 21 is a diagram for illustrating generation method of three-dimensional address by rewriting data of the configuration register 303. Pixel data which compose two-dimensional image have 0 to 17 addresses for example. Images 2101 and 2102 of 3×3 pixels can respectively be specified by generation of two-dimensional addresses. Three-dimensional address may be generated, when the address of the image 2101 is generated, after that the address of the image 2102 is generated.

First, the configuration data is set by the fetch enable signal FETCHEN, and the two-dimensional address of the image 2102 is generated. For example, the initial value INI is set to 0, the first step size STEP1 is set to 1, and the second step size STEP2 is set to 4. Owing to this, the addresses 0→1→2→6→7→8→12→13→14 can be generated.

Normally, after that, the configuration data is set by the fetch enable signal FETCHEN, and the two-dimensional address of the image 2102 is generated. For example, the initial address value INI is set to 3, the first step size STEP1 is set to 1, and the second step size STEP2 is set to 4. Owing to this, the addresses 3→4→5→9→10→11→15→16→17 can be generated.

In this case, however, two times of configuration data setting are required, so that configuration data memory area of the configuration memory 302 is required to be large. For this reason, the three-dimensional address is generated by rewriting the configuration register 303.

Figure 22:
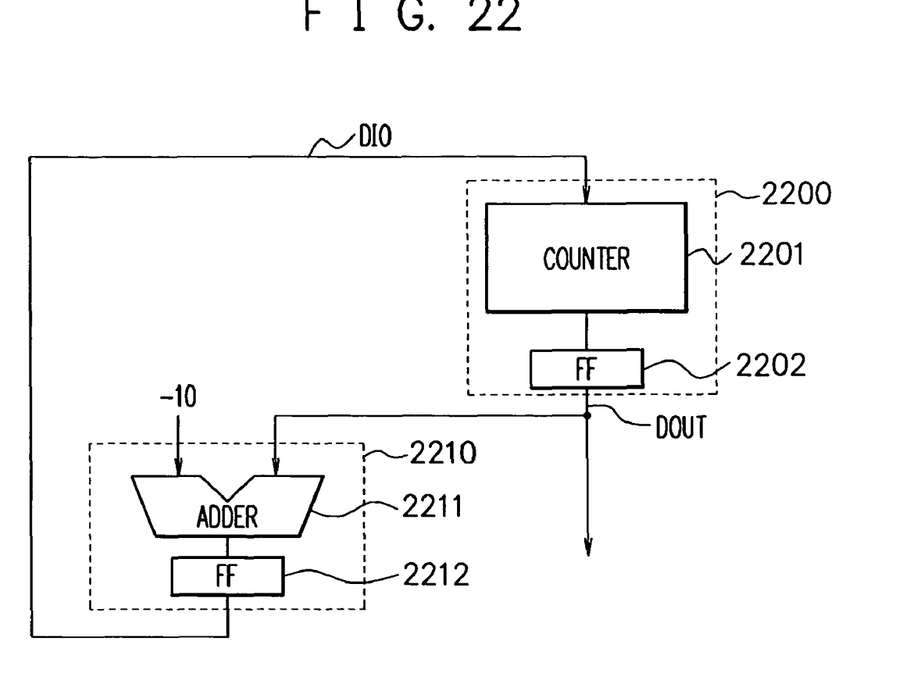
FIG. 22 is a diagram showing a configuration example of a reconfigurable circuit showing the three-dimensional address generation method by rewriting data of the configuration register.

FIG. 22 is a diagram showing a configuration example of a reconfigurable circuit showing generation method of three-dimensional address by rewriting data of the configuration register 303. A first PE 2200 has a counter 2201 and a flip-flop 2202 as the counter mode. A second PE 2210 has an adder 2211 and a flip-flop 2212 as the ALU mode.

First, through the method described above, the counter 2201 generates two-dimensional address of the image 2101. In this case, at the time when address value 13 is generated, the adder 2210 adds 13 which is the address value DOUT and −10, and outputs the addition value "3" as the data DI0 to the counter 2201. The header 2001 of the data DI0 indicates that the register of the address initial value INI is the target to be rewritten, the data 2002 of the data DI0 indicates that the "3" is the data to be rewritten. The write control section 306 writes 3 as the address initial value into the register of the address initial value INI. The step sizes STEP1 and STEP2 keep the previous values.

After address value 14 of the last pixel data of the image 2101 is generated, the counter generates two-dimensional address from the address initial value 3. Owing to this, the addresses 3→4→5→9→10→11→15→16→17 as the addresses of the image 2102 can be generated.

As described above, the addresses of the images 2101 and 2102 can be generated, by repeating generation of the two-dimensional address twice. The register of the address initial value INI may be rewritten, when starting generation of the address of the image 2102. Owing to this, with only one set of the configuration data, two two-dimensional addresses can be generated, and it is possible to make the capacity of the configuration memory 302 small.

User can set the generating interval of the one-dimensional address or the two-dimensional address as the configuration data. Although the counter operation is halfway, data of the configuration register 303 can be rewritten, and therefore it is also possible to generate three-dimensional address.

Further, the step sizes STEP1 and STEP2 may be either of plus value or minus value. If the step size STEP1 or STEP2 is set to plus value, the counter performs count-up operation. On the contrast, if the step size STEP1 or STEP2 is set to minus value, the counter performs count-down operation. By rewriting the step size STEP1 or STEP2 within the configuration register 303, it is also possible to change count operation to count-down operation during count-up operation.

Further, after stopping count operation through the predicate signal PREDICATE, it is also possible to restart count operation by rewriting data of the configuration register 303.

According to this embodiment, by changing operation mode of a PE 204 in accordance with purpose, it is possible to operate the PE 204 as ALU and counter. Thus, an advanced counter can be realized.

In addition, all embodiments described above are concrete exemplary only for implementing the present invention, these should not be restrictively interpreted the technology scope of the present invention. That is, the present invention can be implemented with various other modifications and arrangements without departing from the technology sprit or the main feature hereof.

What is claimed is:

1. A reconfigurable circuit comprising:
a plurality of processing elements, each of the processing elements includes an arithmetic unit respectively;
a sequencer to control an operation of the arithmetic unit; and
a network connected to the plurality of processing elements,
the processing element includes,
a first arithmetic unit to perform addition or subtraction of a first input data and a second input data and outputting output data; and
a first selector to select the output data of the first arithmetic unit or a third input data,
a second selector to select the selected data by the first selector in counter mode and a fourth input data in ALU mode, and to output the selected one as the first input data to the first arithmetic unit, and
a third selector to select a step size of a counter in counter mode and a fifth input data in ALU mode, and to output the selected one as the second input data to the first arithmetic unit,
wherein the first selector selects, in the counter mode, the third input data as an initial value at initial time, in other cases selects the output data of the first arithmetic unit, and outputs the selected one to the second selector.

2. The reconfigurable circuit according to claim 1 further comprising:
a fourth selector to select a first step size or a second step size, and outputting the selected one as the step size of the counter to the third selector.

3. The reconfigurable circuit according to claim 1, wherein the sequencer generates a fetch enable signal and an address, and the reconfigurable circuit further comprising:
a configuration memory storing configuration data;
a configuration register storing the configuration data read out from the configuration memory in response to the fetch enable signal and the address;
a control section controlling the first to third selectors in accordance with the configuration data to be stored in the configuration register; and
an output control section controlling output timing of output data of the first arithmetic unit,
wherein the first arithmetic unit, the configuration register, the control section, and the output control section compose a first processing element.

4. The reconfigurable circuit according to claim 3, wherein the control section initiates, in the counter mode, the first arithmetic unit as the counter with the fetch enable signal as a trigger.

5. The reconfigurable circuit according to claim 3, wherein the configuration register has a register which stores an interval time between respective output data of the first arithmetic unit, and the output control section controls output timing of output data of the first arithmetic unit in response to the interval time.

6. The reconfigurable circuit according to claim 3 further comprising:
a second processing element outputting a valid signal to the first processing element, wherein the control section within the first processing element initiates the first arithmetic unit as the counter with the valid signal as a trigger.

7. The reconfigurable circuit according to claim 3 further comprising:

a second processing element outputting a valid signal to the first processing element, wherein the output control section within the first processing element controls output timing of each output data of the first arithmetic unit in response to the valid signal.

8. The reconfigurable circuit according to claim 3 further comprising:

a second processing element generating a predicate signal in accordance with computing result of a second arithmetic unit, wherein the first processing element starts or stops, in counter mode, operation as the counter in response to the predicate signal.

9. The reconfigurable circuit according to claim 8, wherein when the operation stop of the counter is directed by the predicate signal, the first processing element stops operation as the counter until the fetch enable signal is input.

10. The reconfigurable circuit according to claim 3 further comprising:

a second processing element generating a fifth input data, wherein the configuration register includes: a step size register for storing a step size of the counter; an initial value register for storing the third input data as the initial value; and a rewrite setting register for storing the data which indicates permission of rewriting the data of the step size register or the initial value register, and wherein the first processing element includes a rewrite control section which rewrites the step size register or the initial value register in accordance with the fifth input data, only when the rewrite setting register stores the data which permits rewriting.

11. The reconfigurable circuit according to claim 10, wherein the rewrite control section rewrites the step size register or the initial value register in accordance with the fifth input data, even though the fetch enable signal is not input.

* * * * *